(12) United States Patent  (10) Patent No.: US 8,726,652 B1
Gunter  (45) Date of Patent: *May 20, 2014

(54) TORQUE CONTROLLED ANTAGONISTIC SHAPE MEMORY ALLOY ACTUATOR

(75) Inventor: Ian M. Gunter, Burien, WA (US)

(73) Assignee: The Boeing Company, Chicago, IL (US)

( * ) Notice: Subject to any disclaimer, the term of this patent is extended or adjusted under 35 U.S.C. 154(b) by 200 days.

This patent is subject to a terminal disclaimer.

(21) Appl. No.: 13/191,751

(22) Filed: Jul. 27, 2011

Related U.S. Application Data

(63) Continuation-in-part of application No. 12/880,004, filed on Sep. 10, 2010.

(51) Int. Cl.
*F03G 7/06* (2006.01)
*B64C 9/00* (2006.01)

(52) U.S. Cl.
CPC ...................................... *F03G 7/065* (2013.01)
USPC .................................. 60/527; 60/528; 244/87

(58) Field of Classification Search
CPC ............ F03G 7/06; F03G 7/065; B64C 9/00; B64C 9/02; B64C 9/04; B64C 5/02; G05B 2219/41342
USPC ................. 60/527–529; 337/140; 415/30, 33; 244/235, 87, 88
See application file for complete search history.

(56) References Cited

U.S. PATENT DOCUMENTS

| | | | |
|---|---|---|---|
| 4,700,541 A | 10/1987 | Gabriel et al. | |
| 4,761,955 A | 8/1988 | Bloch | |
| 4,798,051 A | 1/1989 | Foote | |
| 5,127,228 A | 7/1992 | Swenson | |
| 5,396,769 A * | 3/1995 | Brudnicki | 60/528 |
| 5,816,923 A | 10/1998 | Milo et al. | |
| 5,836,066 A | 11/1998 | Ingram | |
| 6,065,934 A | 5/2000 | Jacot et al. | |
| 6,272,857 B1 | 8/2001 | Varma | |
| 6,453,669 B2 | 9/2002 | Kennedy et al. | |
| 6,981,423 B1 * | 1/2006 | Discenzo | 73/800 |
| 7,037,076 B2 | 5/2006 | Jacot et al. | |
| 7,350,762 B2 | 4/2008 | MacGregor et al. | |
| 2005/0198777 A1 | 9/2005 | Mabe | |
| 2006/0191267 A1 | 8/2006 | Song et al. | |
| 2008/0308683 A1 * | 12/2008 | Sankrithi et al. | 244/199.4 |
| 2009/0179109 A1 | 7/2009 | Akkermann et al. | |

OTHER PUBLICATIONS

Andrew C Keefe, Gregory P Carman. "Thermo-mechanical characterization of shape memory alloy torque tube actuators". Department of Mechanical and Aerospace Engineering, University of California, Los Angeles, May 24, 2000.*

* cited by examiner

*Primary Examiner* — Thomas Denion
*Assistant Examiner* — Laert Dounis
(74) *Attorney, Agent, or Firm* — Felix L. Fischer

(57) ABSTRACT

A rotational actuator assembly employs a drive torque actuator having a shape memory alloy (SMA) tube with a first trained twist direction and a return actuator having a SMA tube with an opposite trained twist direction collinear with the drive torque actuator with abutting proximal ends. A central fitting joins the proximal ends. A control system employs a position sensor for the drive torque actuator and the torque sensor for the return actuator for combined antagonistic rotation of the central fitting.

17 Claims, 10 Drawing Sheets

TORQUE CONTROLLED ANTAGONISTIC SHAPE MEMORY ALLOY ACTUATOR

REFERENCE TO RELATED APPLICATIONS

This application is a continuation in part of application Ser. No. 12/880,004 entitled REMOTELY ACTUATED WIND TUNNEL MODEL RUDDER USING SHAPE MEMORY ALLOY filed on Sep. 10, 2010 having a common assignee with the present application, the disclosure of which is incorporated herein by reference as though fully set forth.

BACKGROUND INFORMATION

1. Field

Embodiments of the disclosure relate generally to the field of control surface actuation systems and more particularly to embodiments for a shape memory alloy actuator with dual collinear shape memory alloy tubes having antagonistic reaction to form a smart spring return with a torque sensor.

2. Background

Wind tunnel models typically require movable control surfaces to allow simulation of various control aspects of the vehicle being modeled. Unmotorized surfaces are often used due to their simplicity. However, such surfaces must be positioned by hand requiring interruption of testing to position the surfaces at desired control angles. Models are typically of reduced scale and therefore full size actuators which would be employed in actual vehicles are not readily adaptable for use. Various actuation systems have been employed in wind tunnel models including electromechanical actuators and shape memory alloy (SMA) actuators using wires for hinge moment actuation using differential pull from SMA wires. However, electromechanical actuation is relatively bulky because of low power densities and the need for complex electric motor/gear assemblies. As such, the amount of space required in the supporting structure (for example in a vertical tail) may limit the amount of instrumentation such as pressure sensors that can be installed in the model and may reduce the structural strength which tends to limit their use to lower pressure tunnels having lower loads. Lower pressure tunnels do not match the aerodynamic characteristics of a full scale airplane as well which limits their fidelity as design tools for testing aircraft configurations. SMA wire actuation has limited power and strength, and therefore is similarly suitable for low pressure wind tunnel testing only.

Current shape memory alloys, SMA, such as Nitinol have high force output while transitioning from martensite to austenite or low to high temperatures. The austenite to martensite transition will output significantly lower forces even for a well trained actuator. Most actuator designs ignore the force generated in the actuator as the material transitions from austenite to martensite or assume the useable force to be very small. Actuator designs commonly use a return spring to apply a force opposing the force generated by the SMA during transition from martensite to austenite. An appropriately sized return spring will allow greater displacement of the actuator or higher recoverable strain in the SMA. The tradeoff is that the useable force output of the SMA is decreased because the return spring must be accounted for in the total output of the actuator. A conventional spring that is capable of applying a given load at the actuator stowed position will apply a greater return force opposite the SMA as the actuator deploys following Hooks law. Ideally a spring with decreasing spring rate would be very well suited for an actuator such that a high spring load is only seen at the retracted or nominal actuator position. In practice a passive spring load with decreasing load is not trivial but can be accomplished using cams, linkages or complex spring geometry. Frequently a spring solution becomes heavier and requires more volume than the SMA actuator reducing the most desirable characteristics of SMA actuators.

It is therefore desirable to provide actuators for use in space constrained applications with non-linear return spring characteristics. It is also desirable to provide an actuator having power density much greater than traditional solutions for actuated control surfaces allowing its implementation into applications requiring higher forces and into more restrictive spaces. It is further desirable to provide an actuator with the ability to place the actuating elements on the hinge line of a control surface.

SUMMARY

Embodiments disclosed herein provide a rotational actuator assembly having a first torsion actuator incorporating a shape memory alloy (SMA) tube with a first trained twist direction and a second torsion actuator having a SMA tube with an opposite trained twist direction collinear with the first torsion actuator and having abutting proximal ends. A central fitting joins the proximal ends for fixed common rotational movement. A control system employs a position sensor for the drive torque actuator and the torque sensor for the return actuator for combined antagonistic rotation of the central fitting.

In one exemplary embodiment, a wind tunnel model rudder actuator assembly incorporates a first torsion actuator aligned on a hinge line between a vertical stabilizer and a rudder control surface and having a shape memory alloy (SMA) tube with a first trained twist direction and having a proximal end and a distal end and a second torsion actuator having a SMA tube with a trained twist direction opposite to the first trained twist direction, having a proximal end and a distal end. The second torsion actuator is collinear with the first torsion actuator with the proximal ends of the first and second torsion actuator substantially abutting. A central fitting joins the proximal ends and has a control tang attached to the rudder control surface. A control system employs a position sensor for the drive torque actuator and the torque sensor for the return actuator for combined antagonistic rotation of the central fitting.

A method for rotational actuation is accomplished with the disclosed embodiments by aligning a first torsion actuator having a shape memory alloy (SMA) tube with a first trained twist direction with a hinge line for an actuation surface and aligning a second torsion actuator having a SMA tube with an opposite trained twist direction collinear with the first torsion actuator. Proximal ends of the first and second torsion actuator are joined at a central fitting. Rotational position is compared to a desired rotational position for control of the drive torque actuator and torque on the central fitting is measured for control of the return actuator for agonistic rotation of the central fitting.

The features, functions, and advantages that have been discussed can be achieved independently in various embodiments of the present disclosure or may be combined in yet other embodiments further details of which can be seen with reference to the following description and drawings.

DETAILED DESCRIPTION

In aerodynamic control surfaces like spoilers, ailerons or rudder, the aerodynamic loading acts as a reversing load for a restoring force to a nominal streamlined position. An actuator solution to position these types of devices must be capable of applying force in both directions from nominal.

The embodiments described herein are detailed with respect to wind tunnel model use and for an arbitrary selection of positive and negative displacement. Alternative embodiments may be employed for aerodynamic or hydrodynamic control surfaces which experience a restoring force in motion and may provide symmetrical or asymmetrical positive and negative displacement of the surface. In general, the described embodiments provide an actuator that employs two shape memory alloy (SMA) tubes trained to twist in opposite directions as the tubes are heated. The tubes are centrally coupled together collinearly on the hinge line of the actuator. The ends of the tubes opposite the coupling are fixed to an operating surface attachment of the actuator. Heat is applied using cartridge heaters inside the tubes and controlled by a computerized control system. This actuator configuration allows the actuating elements to be packaged in a space where traditional actuators for a given load would not fit. The power density of the actuator provided, by the antagonistic counter-rotation of the two actuator tubes also allows for much higher actuation forces than would be possible with traditional designs and actuation train consists of only three moving parts greatly reducing the complexity.

Figure 1:
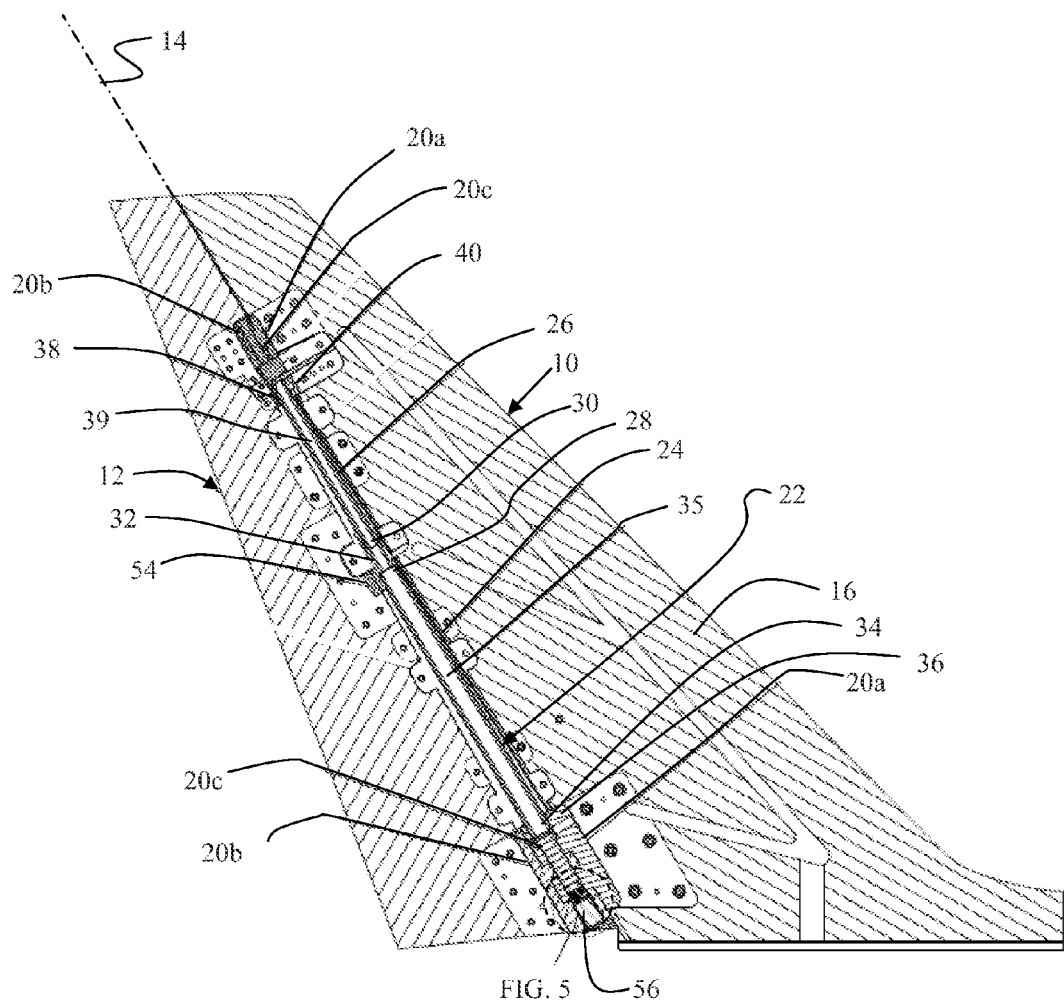
FIG. 1 is a side section view of an embodiment for a torque feedback antagonistic SMA actuator employed in a wind tunnel model rudder.

Referring to the drawings. FIG. 1 a rudder assembly 10 for a wind tunnel model incorporates a rudder control surface 12 which is attached along a hinge line 14 to a vertical stabilizer 16. Rudder hinges 20a and actuator assembly 22 are supported from the vertical stabilizer. Attachment points for the hinge moieties 20b are present in the rudder control surface 12 with hinge pins 20c interengaging the hinge elements. Actuator assembly 22 incorporates a first shape memory alloy (SMA) torsion tube as a drive torque actuator 24 and a second SMA torsion tube as a return actuator 26 which are collinear and engaged to one another at proximal ends 28, 30 in a central fitting 32. Distal end 34 of the drive torque actuator is constrained in a first end clamp assembly 36 (incorporated as a portion of the lower of the rudder hinges 20a for the embodiment shown) and distal end 38 of the return actuator is constrained in a second end clamp assembly 40.

Figure 2:
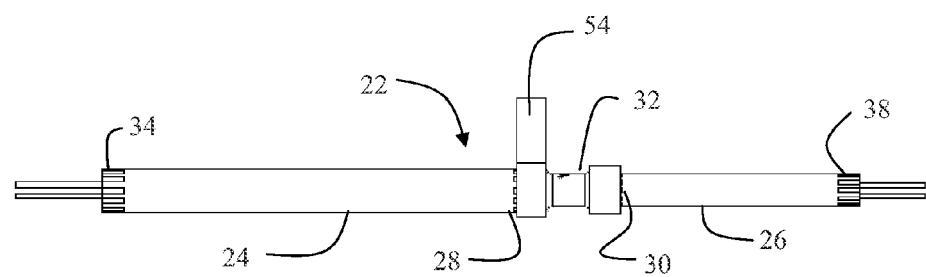
FIG. 2 is a side view of the actuator assembly showing the actuation tubes and support structure of the embodiment of FIG. 1.
Figure 3:
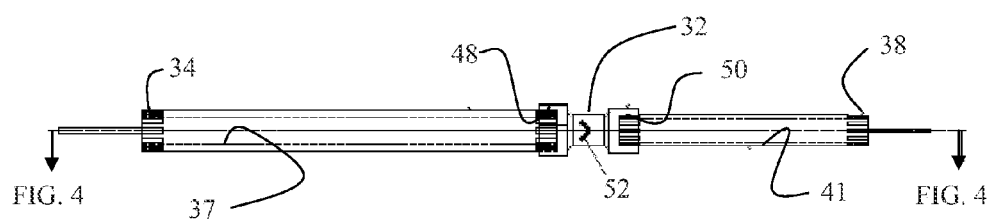
FIG. 3 is a front view of the actuator assembly of FIG. 2.
Figure 4:
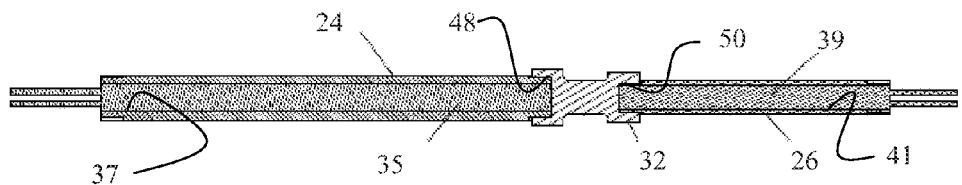
FIG. 4 is a side section view of the actuator assembly of FIG. 2.

Details of the actuator assembly 22 are seen in FIGS. 2 and 3. Drive torque actuator 24 and return actuator 26 are constrained at the distal ends 34 and 38 respectively, as will be described in greater detail subsequently, and have trained memory torsion in opposite directions. For the exemplary embodiments, the torsion actuators are Nickel/Titanium alloy SMA tubes. An alloy content of 55 wt % Ni 45 wt % Ti is employed in the exemplary embodiment. Agonistic action of the drive torque actuator and return actuator based on control temperatures will result in common rotation of the proximal ends 28 and 30 of the SMA tubes of the actuators and the associated central fitting 32. This antagonistic rotational memory of the tubes allows very precise control of positioning created by the actuator with offsetting torsion of the two SMA tubes as will be described in greater detail subsequently. As seen in FIG. 4, cartridge heater 35, contained within a central bore 37 in the SMA tube of drive torque actuator 24, and cartridge heater 39, contained within a central bore 41 in the SMA tube of return actuator 26, provide the temperature control for actuation. In the embodiment shown, the SMA tubes of the drive torque actuator and return actuator are of different diameters and different lengths. In alternative embodiments, the tube lengths, diameters and cross sections may be altered for particular design requirements.

As seen in FIG. 3 for the exemplary embodiment, the proximal ends of the SMA tubes of the actuators are splined in external cross section with central bores 37 and 41 being circular to accommodate the cartridge heaters 35 and 39. A mating spline is employed in the receiving bores 48 and 50 of central fitting 32 for interconnection of the actuator tubes. A surface actuation tang 54, best seen in FIG. 2, extends from the central fitting 32 for attachment to the rudder control surface 12. While spline interconnections have been shown in the drawings for the exemplary embodiment, alternative embodiments to cooperatively engage the proximal ends and central fitting bores for common rotation may employ other geometric configurations or rotational interconnections such as pinned connections, hexagonal connections or blade key and slot. The central fitting 32 includes a chevron strain gage as a torque sensor 52 sensing torque on the central fitting.

The distal ends of the torsion actuator tubes which are located at the opposite ends from the central fitting are constrained in end clamp assemblies 36 and 40 (shown in FIG. 1) which have splined bores to receive the splined distal ends 34 and 38 of the drive torque actuator 24 and return actuator 26 respectively. As with the central fitting, while splined interconnections have been shown in the drawings for the exemplary embodiment, alternative embodiments to cooperatively engage distal ends and end clamp assemblies for constraining rotation may employ other geometric configurations or rotational interconnections such as pinned connections, hexagonal connections or blade key and slot.

Figure 5:
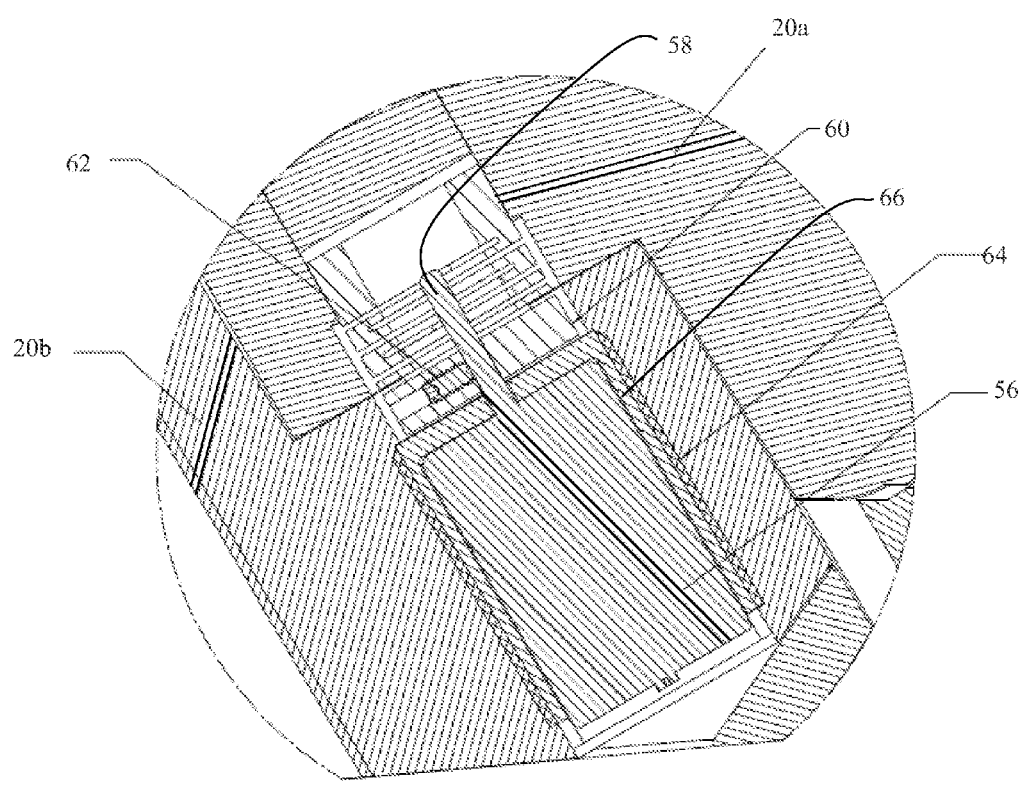
FIG. 5 is a section view of the position sensor attachment.

As shown in FIG. 1 and in detail in FIG. 5, a rotational position sensor 56 is carried by the rudder control surface 12. A pin 58 is constrained from rotation by a coupler 60 with set screw 62. Rotation of the rudder control surface 12 about the hinge line rotates a case 64 of the position sensor with respect to a body 66 providing measurement of the angular position of the rudder with respect to the vertical stabilizer 16.

As previously described, drive torque actuator 24 and return actuator 26 employ SMA tubes which are torsionally reactive in opposite directions. Control of the actuator position at the central fitting is created by heating or cooling of the drive torque actuator 24 using cartridge heater 35. A return spring resistance is provided by return actuator 26 which provides non-linear resistance based on heating or cooling of SMA tube with cartridge heater 39.

Figure 6:
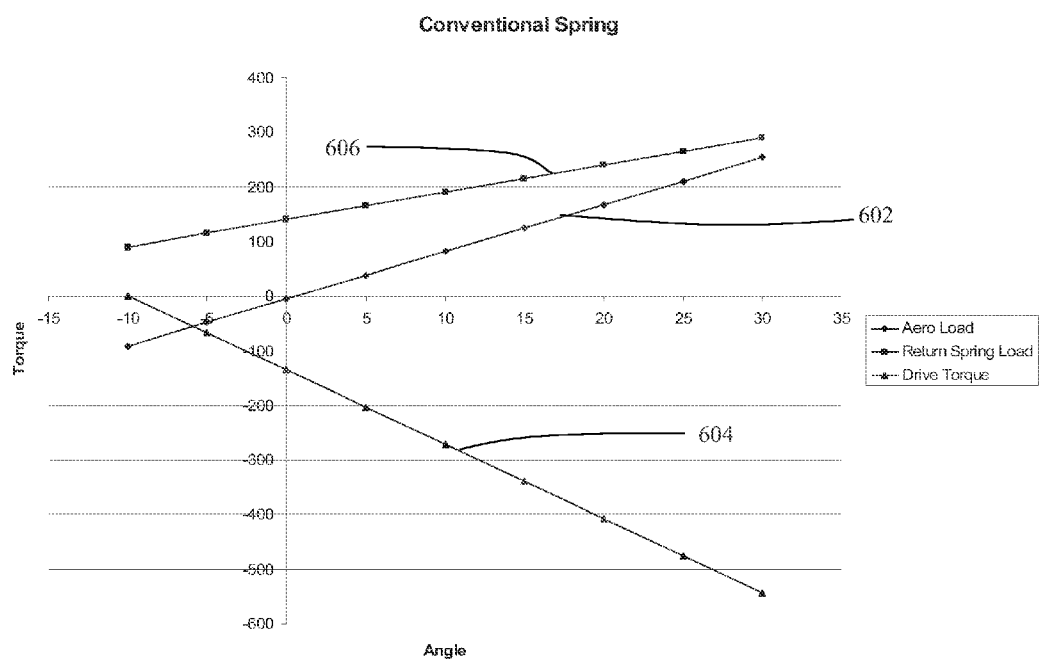
FIG. 6 is a graph of torque with respect to displacement angle for a conventional return spring used in an actuator capable of handling reversing loads.

FIG. 6 shows a graph of aerodynamic torque in a drive torque actuator, trace 602, the aerodynamic load, imposed by the aerodynamic surface, trace 604, and return force generated by a convention return spring, trace 606, based on angular position of the aerodynamic surface over a range of −10° to +30°. In this example the drive torque actuator will apply a negative torque across the entire actuator stroke. The conventional spring in this system could be any material that follows Hooks law such as a torsion spring and will apply a positive torque for all displacements. The return spring needs to apply at least as much torque as the aerodynamic loads when the actuator is fully deflected to the negative position to relieve load opposite to that of the drive torque actuator. An increasing spring system similar to this will have even higher loads at the other full actuator deflection and the drive torque actuator needs to overcome the aerodynamic and return spring loads. In this example the return spring load at 30 degrees is greater than the aerodynamic loading requiring a drive torque actuator with an output more than double the torque required by the aerodynamic loading of the surface itself. The system described could be improved if the spring rate was decreased reducing the size of the drive actuator necessary to meet the aerodynamic loading of the system.

Figure 7:
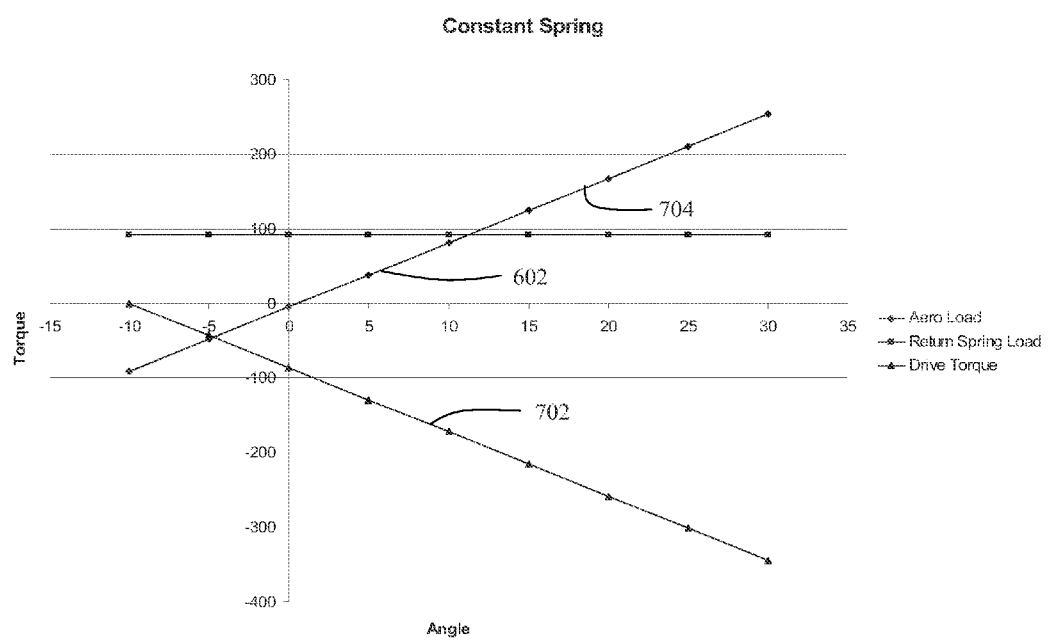
FIG. 7 is a graph of torque with respect to displacement angle for an idealized constant force spring sized for use as a return spring in a reversing load actuator.

FIG. 7 shows an example system with a spring rate reduced to zero such that the torque output, trace 702, is constant at all actuator deflections, trace 602, A conventional spring cannot behave this way. By reducing the torque increase of the spring as the actuator system moves closer to 30° displacement the required output of the drive torque actuator, trace 704, is dramatically reduced compared to a conventional return spring, from approximately 550 inch/lbs to 450 inch/lbs.

Using a SMA return actuator as disclosed in the example embodiment described with respect to FIGS. 1-4 as a smart return spring can generate a flat torque curve using torque sensor 52 and simple closed loop feedback. A very simple proportional control as will be described subsequently may be effectively implemented to create a relatively constant output of the return actuator similar to that seen in FIG. 7. Many systems might benefit form this type of actuator such as an aircraft with wing warping. If the stiffness of the wing structure was calculated or measured, a torque profile could be developed that would apply the necessary torque to deform the wing as desired creating a system without the need for displacement sensors. The more conventional system using displacement sensors on the wing would be very complex and far less robust than a torque based system.

Figure 8:
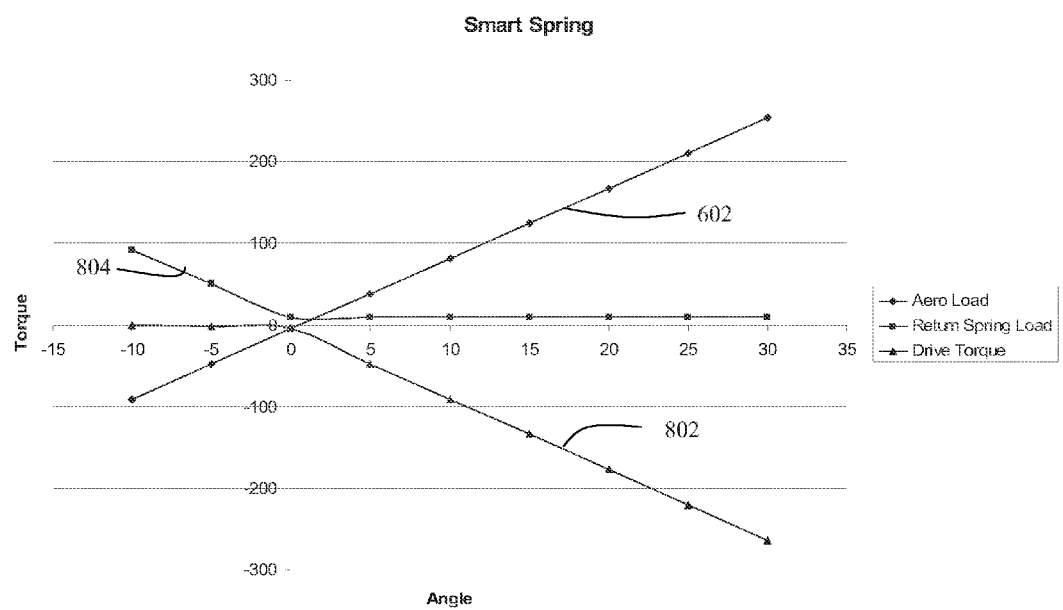
FIG. 8 is a graph of torque with respect to displacement angle for a non-linear smart return spring sized for a specific load profile.

The constant spring concept is a substantial improvement over a conventional return spring solution with only minimal increase in complexity of hardware and control system. Further improvements may be realized if the return actuator described previously employs position information from rotational position sensor 56 in addition to torque measurements. For an actuator designed for a given torque profile a return spring torque curve or set point is developed as a function of displacement as seen in FIG. 8. By creating a smart return spring capable of applying a decreasing load, trace 804, the output needed from the SMA drive torque actuator, trace 802, is further decreased compared to that of the constant force spring.

Unlike linear elastic materials, nickel and titanium based SMAs have varying modulus of elasticity from martensite to austenite. Martensite has a lower modulus of elasticity compared to austenite. SMAs have high damping properties which may be desirable for dynamically loaded systems. In the actuator system described for use in an actuated rudder, the drive torque actuator 24 and return actuator 26 are in the load path where the SMA tubes will act as torsion springs with varying stiffness as angle varies. At actuator angles in the middle of the stroke both tubes will be a combination of martensite and austenite. The higher the percentage of martensite in the actuators the lower the modulus creating a more flexible system where dynamic loading will cause a greater variance from the set point. Properly sized SMA actuators will be fully transformed to austenite when at the end of the power stroke. For the example in FIG. 8. The SMA tube in the drive torque actuator 24 will be fully austenite at 30 degrees and fully martensite at −10 degrees with the reverse true for the SMA tube in the return actuator 26. At intermediate deflections each actuator is a mixture of austenite and martensite and because each actuator contains some martensite the force output could be increased. Increasing the antagonistic forces such that a higher percentage of each actuator is austenite will create a stiffer actuator system.

Figure 9:
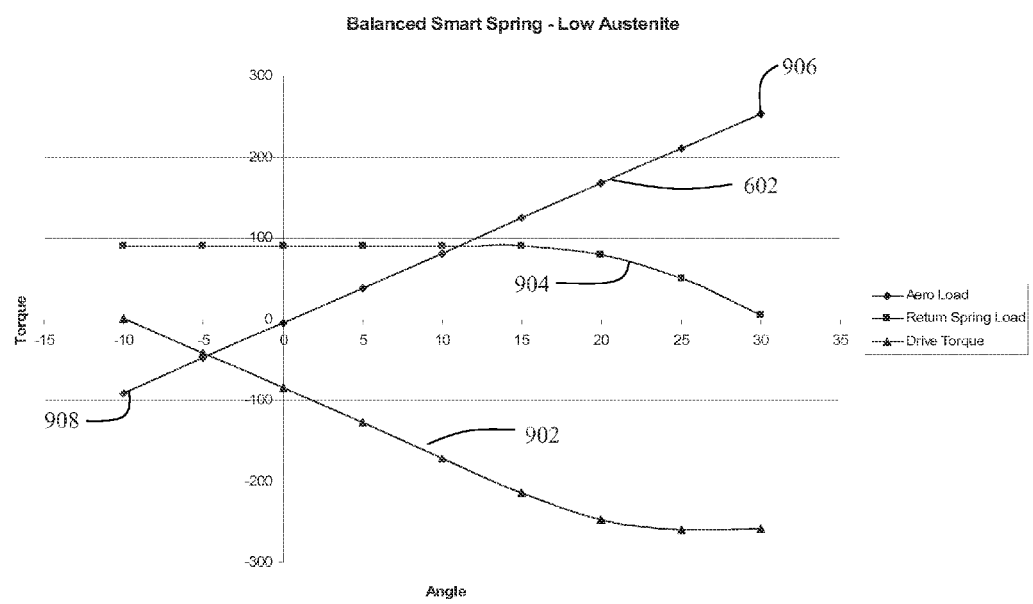
FIG. 9 is a graph of torque with respect to displacement angle for a torque feedback antagonistic design with high austenitic tubes.
Figure 10:
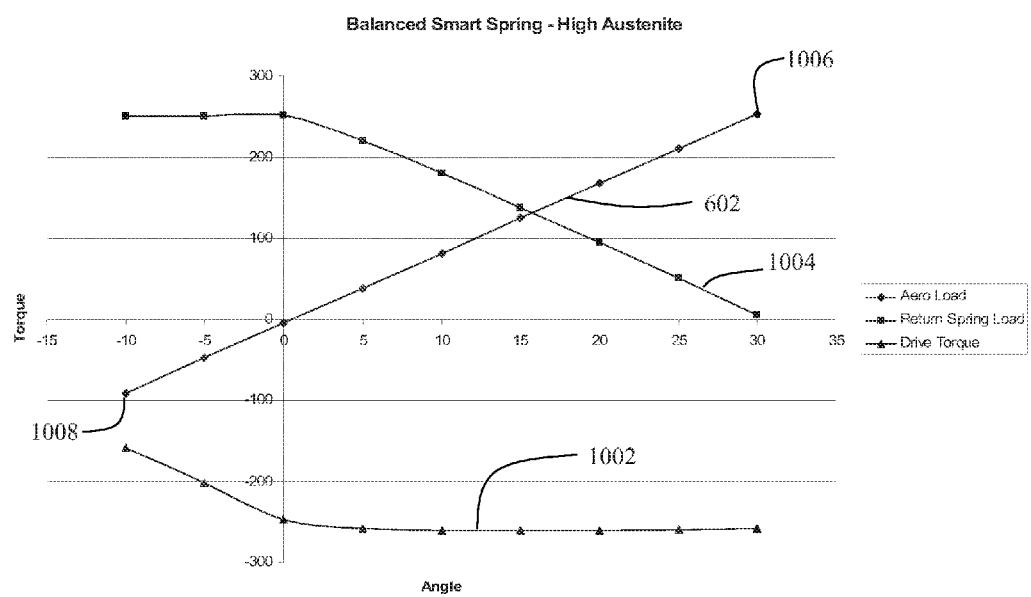
FIG. 10 is a graph of torque with respect to displacement angle for balanced antagonistic actuators with high austenite concentrations.

FIG. 9 shows the required torque curve, trace 902, for drive torque actuator 24 with a range from approximately 0 to −260 in lbs for an offsetting match to the aerodynamic load at a positive maximum 906 where the return actuator 26 is transitioned to a higher concentration of austenite, trace 904 with a range of torque from approximately 90 in lbs to 5 in lbs matching the aerodynamic load at the negative maximum 908 and reducing to near zero at the positive maximum for the aerodynamic load. The maximum drive torque necessary to overcome the aerodynamic loads does not increase in this adaptation of the system but increases the torque of both the return actuator and drive torque actuator over a wider range of displacement, each varying from a value substantially offsetting the aerodynamic load at one maximum to approximately zero load at the opposite maximum. Selecting SMA tubes for the drive torque actuator and return actuator with balanced max torque output would further increase the amount of austenite in the actuators and result in torque curves for the drive torque actuator, trace 1002, and return actuator, trace 1004 as seen in FIG. 10. The embodiment of FIG. 10 provides a significantly stiffer system with high offsetting torque of the return actuator and drive torque actuator at both the positive and negative maxima, 1006 and 1008 respectively. For this embodiment, torque on the drive torque actuator is approximately −160 in lbs at the negative maximum for the aerodynamic load increasing to approximately −260 and the positive maximum for the aerodynamic load while torque on the return actuator is approximately 250 in lbs at the negative maximum (offsetting both the negative aerodynamic torque of approximately −90 in lbs and the −160 in lb drive torque actuator torque. Both the drive torque actuator and the return actuator vary in load from a value equal to the aerodynamic load at one maximum plus an offset equal to a predetermined torque value to the predetermined torque value at the second maximum.

Figure 11:
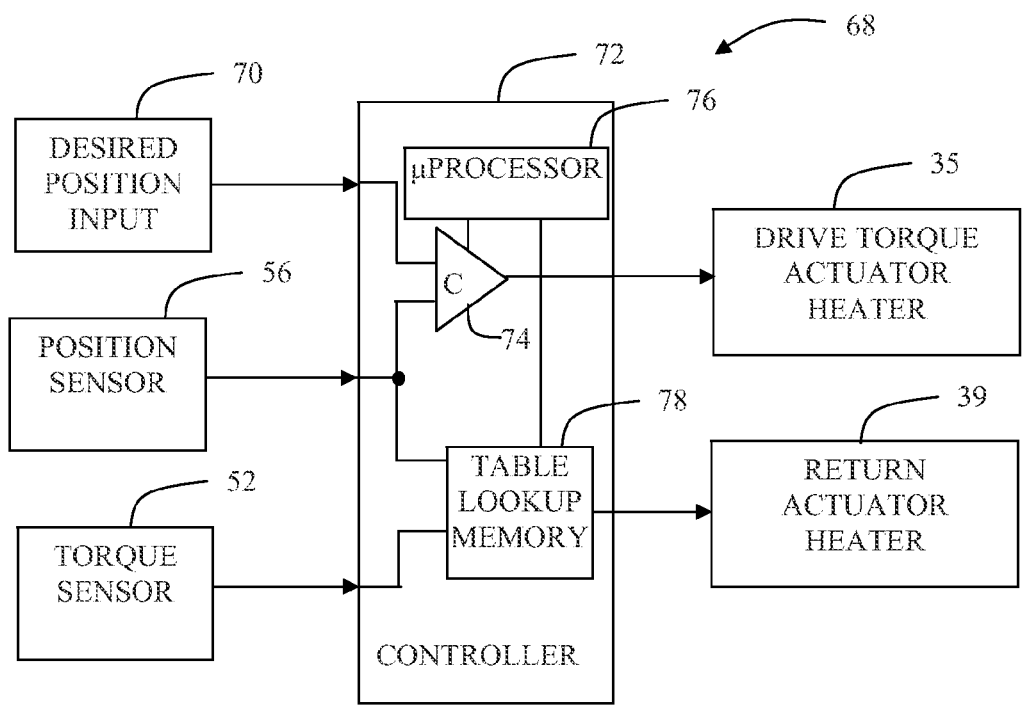
FIG. 11 is a block diagram of a control system for the actuator assembly.
Figure 12:
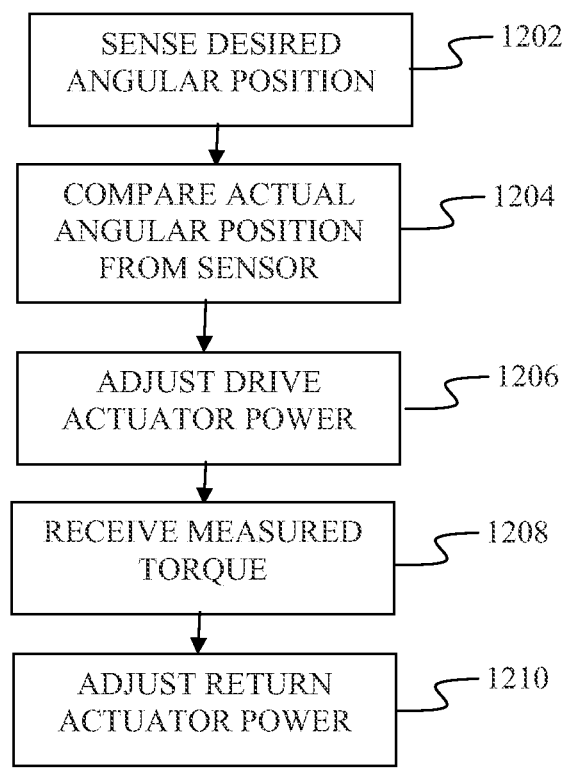
FIG. 12 is a flow chart of a control method for the embodiment of FIG. 11.

Control of the actuator assembly 22 is accomplished with input from the torque sensor 52 and rotational position sensor 56 as shown in FIGS. 11 and 12. In the control system 68 a desired position input 70 is provided as an angular position command to a controller 72. Controller 72 receives input from the rotational position sensor 56 providing actual position and performs a comparison in a compare circuit 74 to control an output incrementing or decrementing power to the cartridge heater 35 for the drive torque actuator 24. Actual temperature measurement is not required allowing simple feedback control. Controller 72 may employ a microprocessor 76 to accomplish the compare function and a memory 78 with lookup tables may provide a very simple control for power required by the heater. Use of the table lookup allows modification of the curvature of the drive torque curve as shown in FIGS. 8, 9 and 10. Similarly, torque from sensor 52 is received by the controller and using a table lookup in the memory provides an output incrementing or decrementing power as required to the cartridge heater 39 for return actuator 26. For the system configuration as described with respect to FIG. 7, sensed torque is maintained constant by microprocessor control of the return actuator heater power. For a more complex return spring curve as shown in FIGS. 8, 9 and 10, inputs from both the torque sensor 52 and rotational position sensor 56 are processed through the lookup table to control the output power for the return actuator heater. Again, measurement and control of actual temperature is not required.

As shown in FIG. 12, desired angular position is sensed, step 1202. Controller 72 compares actual position from rotational position sensor 56 to desired position, step 1204, and provides a power output adjustment for the cartridge heater 35 in drive torque actuator 24, step 1206. Substantially simultaneously, the controller receives measured torque, step 1208, and employing sensed actual rotational position as required for complex return spring curvature based on a schedule in the table lookup memory for the desired torque curve, provides an incrementing or decrementing power adjustment for cartridge heater 39 in return actuator 26, step 1210.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A rotational actuator assembly comprising:
    a drive torque actuator having a first shape memory alloy (SMA) tube with a first trained twist direction and having a proximal end and a distal end;
    a return actuator having a second SMA tube with a trained twist direction opposite to the first trained twist direction and having a proximal end and a distal end, said return actuator collinear with the drive torque actuator with proximal ends;
    a central fitting joining the proximal ends and having a torque sensor; and,
    a control system employing a position sensor for the drive torque actuator and a torque sensor for the return actuator for combined antagonistic rotation of the central fitting, said control system including
        a first heater received in the SMA tube of the drive torque actuator and a second heater received in the SMA tube of the return actuator; and
        wherein the control system is responsive to an angular position command and provides a comparison to an output of the position sensor and an output incrementing or decrementing power to the first heater, said control system further providing an output incrementing or decrementing power to the second heater responsive to the torque sensor; and,
    wherein heating of the first SMA tube urges rotation of the central fitting in a first direction and heating of the second SMA tube urges rotation of the central fitting in a direction opposite the first direction.

2. The rotational actuator assembly as defined in claim 1 further comprising:
    a first end clamp assembly constraining the distal end of the drive torque actuator; and,
    a second end clamp assembly constraining the distal end of the return actuator.

3. The rotational actuator assembly as defined in claim 2 wherein the distal end of the drive torque actuator is splined and the first end clamp assembly incorporates a mating splined bore.

4. The rotational actuator assembly as defined in claim 2 wherein the distal end of the return actuator is splined and the second end claim clamp assembly incorporates a mating splined bore.

5. The rotational actuator assembly as defined in claim 1 wherein the central fitting includes a first receiving bore for the proximal end of the drive torque actuator and a second receiving bore for the proximal end of the return actuator.

6. The rotational actuator assembly as defined in claim 5 wherein the first receiving bore and drive torque actuator are engaged with a mating spline and the second receiving bore and proximal end of the return actuator are engaged with a mating spline.

7. The rotational actuator assembly as defined in claim 1 wherein the central fitting includes a tang extending for interconnection to an aerodynamic surface for rotation with the fitting.

8. The rotational actuator assembly as defined in claim 1 wherein the control input to the second heater is further responsive to the position sensor and is non-linear based on the torque and position.

9. The rotational actuator assembly as defined in claim 1 wherein the SMA tube in the drive actuator contains an austenitic/martensitic ratio to provide a range of torque from approximately 0 at first maximum and increasing to offset an aerodynamic load at a second maximum and the SMA tube in the return actuator contains an austenitic/martensitic ratio to provide a range of torque from a first value to offset an aerodynamic load at the first maximum and decreasing to approximately 0 at the second maximum.

10. The rotational actuator assembly as defined in claim 1 wherein the SMA tube in the drive actuator contains an austenitic/martensitic ratio to provide a range of torque from a first value offsetting a predetermined torque value of the return actuator at first maximum and increasing to offset an aerodynamic load and the predetermined torque value at a second maximum and the SMA tube in the return actuator contains an austenitic/martensitic ratio to provide a range of torque from a first value to offset an aerodynamic load plus the predetermined torque value at the first maximum and reducing to the predetermined torque value at the second maximum.

11. A wind tunnel model rudder actuator assembly comprising:
    a drive torque actuator aligned on a hinge line between a vertical stabilizer and a rudder control surface and having a shape memory alloy (SMA) tube with a first trained twist direction and having a proximal end and a distal end;
    a return actuator having a SMA tube with a trained twist direction opposite to the first trained twist direction and having a proximal end and a distal end, said return actuator collinear with the drive torque actuator with proximal ends;
    a central fitting joining the proximal ends and having a control tang attached to the rudder control surface and a torque sensor; and
    a control system employing a position sensor for the drive torque actuator and the torque sensor for the return actuator for combined antagonistic rotation of the central fitting, said control system including a first heater received in the SMA tube of the drive torque actuator and a second heater received in the SMA tube of the return actuator; and wherein the control system is responsive to an angular position command and provides a comparison to an output of the position sensor and an output incrementing or decrementing power to the first heater, said control system further providing an output incrementing or decrementing power to the second heater responsive to the torque sensor.

12. The wind tunnel model rudder actuator assembly as defined in claim 11 further comprising:

a first end clamp assembly constraining the distal end of the drive torque actuator to the vertical stabilizer; and, a second end clamp assembly constraining the distal end of the return actuator to the vertical stabilizer.

13. The wind tunnel model rudder actuator assembly as defined in claim 12 wherein the distal end of the drive torque actuator is splined and first end clamp assembly incorporates a mating splined bore.

14. The wind tunnel model rudder actuator assembly as defined in claim 12 wherein the distal end of the return actuator is splined and the second end clamp assembly incorporates a mating splined bore.

15. The wind tunnel model rudder actuator assembly as defined in claim 11 wherein the control system includes a first heater received in the drive torque actuator and a second heater received in the return actuator;

and wherein the control system is responsive to an angular position command and provides a comparison to an output of the position sensor for control input to the first heater, said control system further providing a control input to the second heater responsive to the torque sensor.

16. A method for rotational actuation comprising:

aligning a drive torque actuator having a shape memory alloy (SMA) tube with a first trained twist direction with a hinge line for an actuation surface;

aligning a return actuator having a SMA tube with an opposite trained twist direction collinear with the drive torque actuator;

joining proximal ends of the drive torque actuator and return actuator at a central fitting;

comparing rotational position to a desired rotational position for control of the drive torque actuator, including receiving an angular position command;

comparing the angular position command to an actual position of the central fitting; and incrementing or decrementing power to a heater in the drive torque actuator; and, measuring torque on the central fitting by receiving input from a torque sensor on the central fitting; and incrementing or decrementing power to a heater in the return actuator to maintain a desired torque, for control of the return actuator for antagonistic rotation of the central fitting.

17. The method of claim 16 wherein the desired torque is non-linear with respect to angular position and further comprising:

measuring actual rotational position for combination with desired torque at that position for determining the increment or decrement of power.

* * * * *